United States Patent [19]

Kiyonaga et al.

[11] Patent Number: 4,867,918
[45] Date of Patent: Sep. 19, 1989

[54] GAS DISPERSION PROCESS AND SYSTEM

[75] Inventors: Kazuo Kiyonaga, Honolulu, Hi.; Lawrence M. Litz, Pleasantville; Thomas J. Bergman, North Tarrytown, both of N.Y.

[73] Assignee: Union Carbide Corporation, Danbury, Conn.

[21] Appl. No.: 139,573

[22] Filed: Dec. 30, 1987

[51] Int. Cl.[4] .............................................. B01F 3/04
[52] U.S. Cl. .............................. 261/76; 261/DIG. 75; 261/DIG. 78
[58] Field of Search ............... 261/DIG. 78, DIG. 75, 261/76

[56] References Cited

U.S. PATENT DOCUMENTS

| | | | |
|---|---|---|---|
| 2,060,557 | 11/1936 | Davis | 261/DIG. 75 |
| 2,413,102 | 12/1946 | Ebert et al. | 261/DIG. 75 |
| 3,371,618 | 3/1968 | Chambers | 261/DIG. 75 |
| 3,400,818 | 9/1968 | Tarjan | 261/DIG. 75 |
| 3,734,111 | 5/1973 | McClintock | 261/DIG. 75 |
| 3,778,038 | 12/1973 | Eversole et al. | 261/50.1 |
| 4,226,719 | 10/1980 | Woltman | 261/DIG. 75 |
| 4,244,821 | 1/1981 | Molvar | 261/DIG. 75 |
| 4,261,347 | 4/1981 | Spencer, III et al. | 261/DIG. 75 |
| 4,639,340 | 1/1987 | Garrett | 261/36.1 |

FOREIGN PATENT DOCUMENTS

| | | | |
|---|---|---|---|
| 1517502 | 11/1970 | Fed. Rep. of Germany | 261/DIG. 78 |
| 2053991 | 5/1972 | Fed. Rep. of Germany | 261/DIG. 78 |
| 2201607 | 8/1972 | Fed. Rep. of Germany | 261/DIG. 78 |

OTHER PUBLICATIONS

"Sound Speed in Liquid-Gas Mixtures: Water-Air and Water-Steam", Susan Werner Kieffer, Journal of Geophysical Research, vol. 82, No. 20, Jul. 10, 1977, pp. 2895-2904.

"Odour Problems at Effluent Treatment Plants", M. E. Garrett and C. Jeffries, Water Serv., (London), vol. 88, (1062), 1984, pp. 338-341.

Primary Examiner—Tim Miles
Attorney, Agent, or Firm—A. H. Fritschler

[57] ABSTRACT

Gas dispersion in a liquid is enhanced by combining the gas and liquid in close proximity to a venturi or other flow constriction means used to create supersonic flow velocities and subsequent deacceleration to sub-sonic velocity. When a venturi is employed, the gas-liquid mixing occurs in the converging portion of the venturi or upstream but in close proximity to said venturi. Turbulent flow conditions upstream of the venturi or other flow constriction means adequate to disperse the gas uniformly in the liquid are not required and, surprisingly, the gas and liquid need not be uniformly dispersed prior to acceleration to supersonic velocity.

20 Claims, 5 Drawing Sheets

GAS DISPERSION PROCESS AND SYSTEM

BACKGROUND OF THE INVENTION

1. Field of the Invention

This invention relates to the mixing of gases and liquids. More particularly, it relates to enhancing the dispersion of gases in liquids.

2. Description of the Prior Art

The dispersion of gases in liquids is an important feature of a wide variety of industrial operations. Thus, gases are dispersed in liquids for numerous gas dissolution, gas liquid reaction and gas stripping of dissolved gas applications. As the gas is more finely dispersed in the liquid in the form of very small gas bubbles, the interfacial surface area between the gas and liquid is appreciably increased as compared to said surface area between the liquid and a like quantity of gas in the form of larger gas bubbles. In turn, an increase in the interfacial surface area between the gas and liquid is known to increase the mass transfer of the gas from the gas bubbles into the liquid, as well as the transfer of dissolved gas from the liquid into the gas bubble. Thus, by providing much higher interfacial area, all gas-liquid processes, such as gas dissolution, gas stripping and reactions between the gas phase and substances in the liquid phase will be improved.

As a consequence of a change in flow velocity of a gas liquid mixture crossing the velocity of sound in said mixture, gas bubbles in the liquid are very substantially broken up by the sonic shock wave created thereby. This phenomenon occurs upon an acceleration of the flow velocity of the gas-liquid mixture from a velocity of less than the speed of sound to one exceeding said speed of sound in the gas liquid mixture, and/or when the flow velocity is decreased from above to below said supersonic velocity. As a result of said shock wave effect, fine gas bubbles having diameters in the range of from about 0.1 to 0.01 mm are produced. For gas-liquid mixtures initially having larger sized gas bubbles typically having a bubble diameter of about 2 mm, the formation of such fine gas bubbles corresponds to an increase in bubble surface area on the order of 20 to 200 times compared to the surface area of the initial larger diameter bubbles.

The use of sonic shock waves to reduce the size of gas bubbles dispersed in a liquid is disclosed in the Garrett patent, U.S. Pat. No. 4,639,340, which is directed particularly to the dissolving of oxygen in waste water. Oxygen is introduced from a side pipe into a pressurized stream of waste water and is uniformly dispersed in said stream at a flow velocity less than the velocity of sound in the gas-liquid mixture. For this purpose, Garrett indicates that a flow velocity of at least about 2 meters per second should be used to establish a turbulent flow condition such as to create and maintain a uniform dispersion of gas bubbles in the liquid, apart from the oxygen that is dissolved in the waste water stream, immediately downstream of the point at which the side pipe for oxygen introduction joins the conduit through which the pressurized stream of waste water is being passed. Typically, such uniform dispersion of gas in liquid can be developed in a turbulent flow condition in a distance of at least about three times the diameter of the conduit. It will be appreciated, however, that the distance between the point of oxygen introduction and the positioning of means for acceleration of the gas-liquid mixture to supersonic velocity may be considerably longer than this distance in practical commercial applications. Garrett discloses the passage of the uniformly dispersed gas-liquid mixture formed at said velocity in the subsonic, but turbulent flow, range to a venturi for the acceleration of the flow velocity to a velocity in excess of the speed of sound in said gas-liquid mixture. Garrett states that, in the region of the venturi between its upstream end and its throat portion of minimum diameter, the velocity of said uniformly dispersed gas liquid mixture increases and reaches a velocity in excess of the velocity of sound in said dispersion, and that a sonic shock wave is created within said region of the venturi. As a result, the relatively coarse bubbles of oxygen in the dispersion are sheared into smaller or finer bubbles by the turbulence resulting from the shock wave. After passing through the throat of the venturi, the pressurized stream is deaccelerated as the venturi widens until it is returned to a sub-sonic velocity, which is nevertheless sufficiently high to maintain turbulent flow and the uniform dispersion of oxygen bubbles in the waste water stream. Garrett also discloses that, in the event the oxygen were introduced into the waste water stream through the throat of the venturi, as is conventionally accomplished for certain gas-liquid mixing operations, no sonic shock wave would be produced in the upstream, converging portion of the venturi.

Despite such advantageous use of venturi devices to enhance the dispersion of a gas in a liquid, there remains a desire and a need to further enhance the process and system for dispersing gases in liquids. Such requirements pertain to gas-liquid processing operations in general, and are related to the continual desire in the art for improvement in industrial processing operations. There is also a general desire in the art for a more efficient use of oxygen, nitrogen and other industrial gases in the wide variety of commercial applications in which industrial gases are presently employed or could be advantageously employed to improve the current practice in the art.

It is an object of the invention, therefore, to provide an improved process and system for the dispersion of gases in liquids.

It is another object of the invention to provide a process and system for enhancing the interfacial surface area between a gas and the liquid in which it is dispersed so as to enhance the mass transfer between said gas and liquid.

It is a further object of the invention to provide a process and system capable of enhancing the efficiency of gas liquid dispersion operations.

With these and other objects in mind, the invention is hereinafter described in detail, the novel features thereof being particularly pointed out in the appended claims.

SUMMARY OF THE INVENTION

Enhanced gas dispersion is achieved by introducing the gas into the liquid in close proximity to flow constriction means used to create supersonic flow velocities. Flow velocities upstream of the constriction need not be great enough to create and maintain turbulent flow conditions. Surprisingly, the gas and liquid need not be uniformly dispersed prior to the acceleration of the gas liquid mixture to supersonic velocity, and its subsequent deacceleration to sub-sonic velocity, to achieve an enhanced dispersion of the gas in the liquid.

BRIEF DESCRIPTION OF THE DRAWING

The invention is further described herein with reference to the accompanying drawings in which.

DETAILED DESCRIPTION OF THE INVENTION

Figure 1:
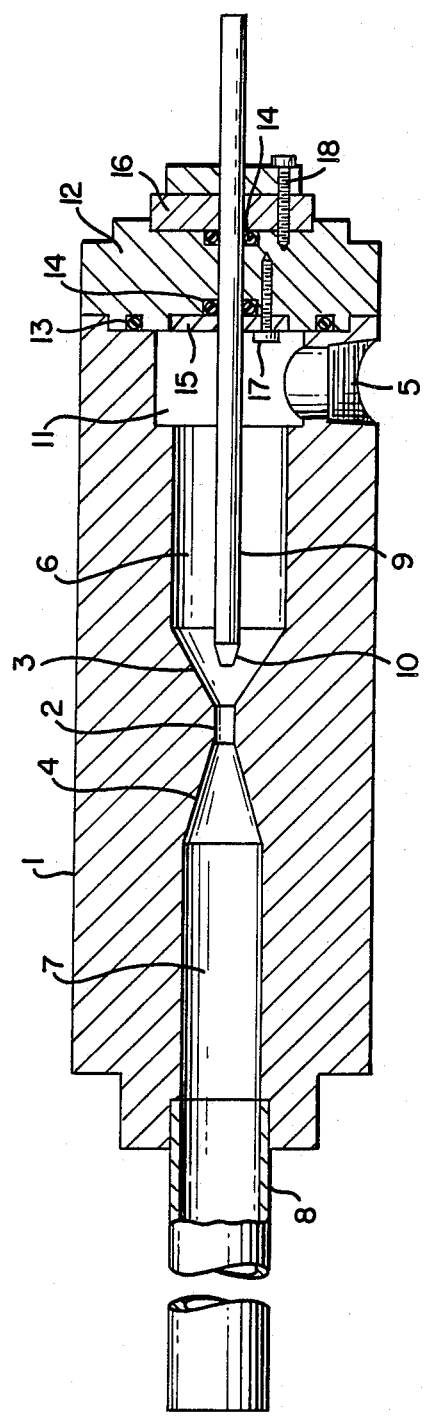
FIG. 1 represents a side elevational view, partly in cross-section, of an embodiment of the gas-liquid dispersion system of the invention in which a venturi is employed.

The objects of the invention are accomplished by the use of a gas-liquid dispersion process and system wherein the gas and liquid are mixed in close proximity to constriction means capable of accelerating the flow velocity of the gas-liquid mixture from below to above supersonic velocity, with subsequent deacceleration to below said supersonic velocity of the gas liquid mixture. The flow velocity of the mixture prior to such acceleration need not be maintained sufficiently high to establish turbulent flow conditions, and the gas need not be uniformly dispersed in the liquid prior to such acceleration. Nevertheless, the mass transfer rate between the gas and the liquid is significantly and surprisingly enhanced over that obtainable using the prior art practice referred to above, in which the flow velocity is to be maintained high enough to establish and maintain turbulent flow conditions, with consequent uniform dispersion of the gas in the liquid at a relatively large distance upstream of a venturi used to accelerate the mixture to supersonic velocity.

In the practice of various practical commercial embodiments of the invention, the gas to be dispersed in the liquid is injected with a liquid stream as said liquid stream passes with close proximity with the flow constriction means used to accelerate the flow velocity of the gas-liquid mixture from a sub-sonic to a supersonic velocity, with subsequent deacceleration to a sub-sonic velocity. It is also within the scope of the invention, however, to employ embodiments in which the liquid phase is injected into a stream of gas, as said gas stream similarly passes into close proximity with said constriction means. It will be appreciated that the following description of the invention particularly with reference to the introduction of gas into a stream of liquid is for convenience with respect to generally preferred embodiments, but should not be construed as limiting the scope of the invention as recited in the appended claims.

For purposes of the invention, the acceleration of the gas liquid mixture from sub-sonic to supersonic flow velocities, with subsequent deacceleration to sub-sonic levels may be accomplished by any convenient flow constriction means capable of achieving the desired acceleration-deacceleration of the gas liquid dispersion. One such form of flow constriction means is a simple orifice arrangement in which an orifice plate is positioned in the flow line, with said plate having an opening therein sized to achieve the desired gas-liquid mixture flow for said acceleration-deacceleration purposes with its consequent sonic shock wave effect on the gas-liquid mixture. Another form of constriction means that can be employed is a flow line or conduit having a reduced diameter section, with such reduced diameter likewise being adapted so as to cause the flow velocity of the gas liquid mixture to accelerate from the sub-sonic flow velocity at which the mixture approaches the reduced diameter section to a supersonic velocity. As the gas-liquid mixture exits from the reduced diameter section, its velocity is decreased to a desired velocity in the sub-sonic range as determined by the diameter of the flow conduit downstream of said reduced diameter section. Those skilled in the art will appreciate that the positioning of an orifice plate or a reduced diameter section in a flow conduit not only creates a desired increase in flow velocity, but also an accompanying increase in pressure loss across the flow constriction means. Such increased pressure loss will be understood to increase the power requirements of the overall gas-liquid dispersion operation, and is generally undesirable from an overall efficiency and cost viewpoint. As a result, the tapered configuration of a venturi is a generally preferred form of flow constriction means, with the venturi achieving the desired acceleration-deacceleration to above and below the velocity of sound in the gas liquid mixture at the prevailing pressure conditions while tending to minimize the accompanying pressure loss in the flow conduit.

A particular embodiment of the gas-liquid dispersion system of the invention, employing a venturi for gas liquid acceleration and deacceleration purposes, is illustrated in FIG. 1 of the drawings, in which numeral 1 represents a gas-liquid dispersion body in which said venturi section is machined for use as described herein. The venturi comprises throat section 2 of minimum diameter, upstream converging section 3 and downstream diverging section 4. At said upstream end of dispersion body 1, an inlet conduit 5 is provided for the introduction of a stream of liquid into dispersing body 1. In this embodiment, the direction of said flow of liquid is perpendicular to upstream liquid flow conduit 6 through which the liquid is passed to upstream converging section 3 of the venturi, although those skilled in the art will appreciate that other configurations of liquid flow can be employed to minimize pressure losses in the system. The gas-liquid mixture discharged from the venturi through downstream diverging section 4 passes into downstream flow conduit 7 for passage from said dispersion body 1 through gas-liquid outlet line 8.

For the introduction of gas into the liquid stream passing through dispersion body 1, gas inlet tube 9 is positioned within upstream liquid flow conduit 6 and extends into upstream converging section 3 of the venturi. Gas injection tip 10 is provided to facilitate the injection of gas into the liquid in said converging section 3 of the venturi. The upstream end of gas inlet tube 9 will be seen to extend through liquid chamber 11, into which liquid passes from liquid inlet 5 for discharge into upstream liquid flow conduit 6, and inlet cover plate 12 for communication with a source of supply for said gas. O-rings are positioned between cover plate 12 and the upstream end portion of dispersion body 1 to provide a fluid tight seal therebetween. O-rings 14 are similarly provided to assure a fluid-tight seal between gas inlet tube 9 and cover plate 12. Seal plates 15 and 16 are provided at the downstream end of said cover plate 12, respectively, to assure proper deformation of O-rings 14 into a fluid-type position. Suitable clamping means 17 and 18 are used to secure end plate 12 to said seal plates 15 and 16 and to dispersion body 1. Those skilled in the art will appreciate that any convenient means, manual, mechanical or otherwise, can be used to slide the gas inlet tube into any desired position relative to the position of the venturi.

In an embodiment of the invention as illustrated in said FIG. 1, throat section 2 of the venturi was 0.19" in inside diameter and 0.36" long. The inside diameters of upstream and downstream flow conduits 6 and 7 were 0.83" and 0.63", respectively. Converging section 3 was 0.72" long, and diverging section 4 was 1" long. Thus, it will be appreciated that the converging and diverging sections of the venturi need not be of the same dimensions. The included angle of diverging section 4 of the venturi in this embodiment is 34°. The included angle of converging section 3 is 35°, with gas inlet tube 9 being ¼" in inside diameter with gas injection tip 10 being 1/16" in inside diameter. Said gas injection tip 10 was positioned at about 50% of the distance from the upstream beginning of throat section 2 to the upstream end of converging section 3 of the venturi.

As indicated above, the injection of one fluid into the other, typically gas into a liquid stream, is carried out in close proximity to the flow constriction means used to create acceleration to supersonic velocities and deacceleration to sub-sonic velocities. For purposes of the invention, such close proximity to the flow constriction means is intended to mean that the injection point, e.g. of gas into liquid, should be positioned at a distance not exceeding about one diameter in length upstream of the flow constriction means, based on the diameter of the flow conduit in which the orifice plate, reduced diameter section, venturi or other desired form of flow constriction means is positioned. It will be understood that, with respect to a venturi form of flow constriction means, the gas or other injection means should be positioned at a distance not more than that corresponding to one diameter in length from the upstream inlet end of converging section 3, based on the diameter of the flow conduit upstream of the venturi, i.e. upstream liquid flow conduit 6 in FIG. 1 of the drawings. While gas inlet tube 9 can thus be positioned in liquid flow conduit 6 upstream of, but in close proximity to, the venturi, it is preferred that said gas inlet tube 9 be positioned within the converging section of the venturi itself.

Figure 2:
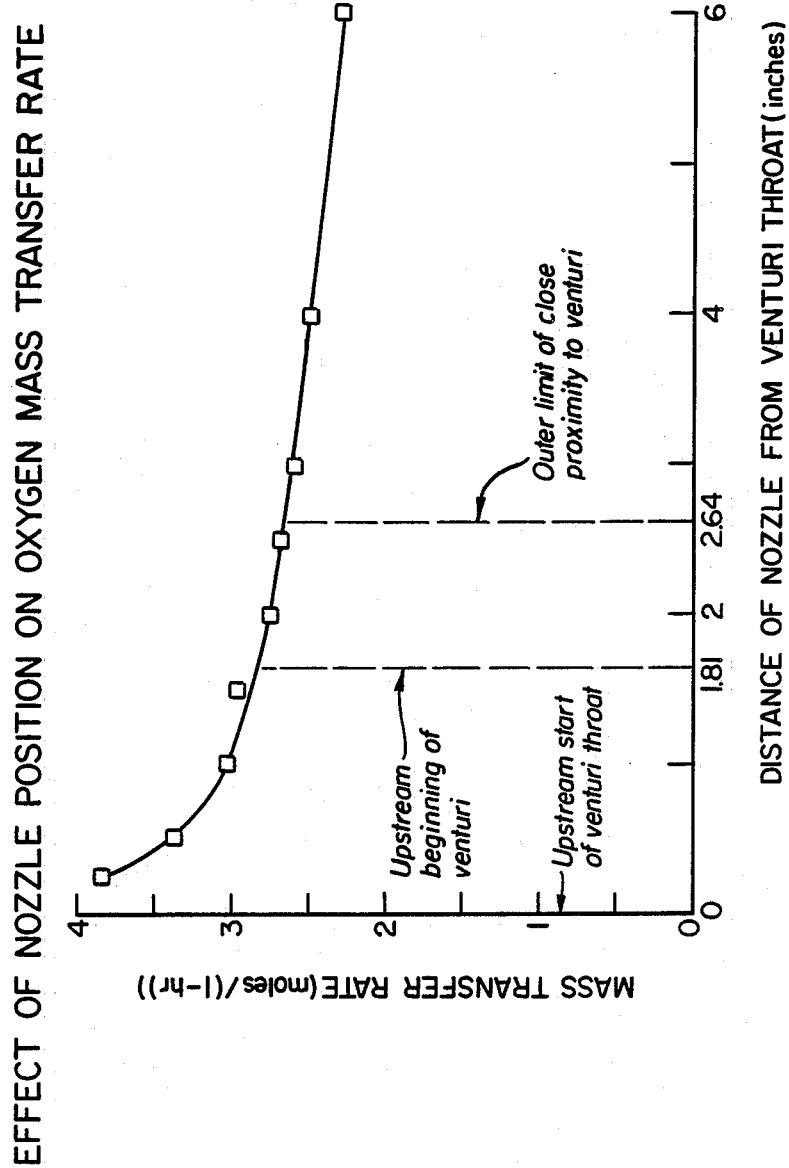
FIG. 2 is a chart illustrating the effect of the distance of the oxygen injection point from the throat of a venturi on the mass transfer rate of the oxygen in a stream of water.

The chart of FIG. 2 illustrates the effect of the positioning of tip 10 of gas inlet tube 9 on the oxygen mass transfer in an oxygen dispersion in water application carried out in a gas-liquid dispersion system essentially as shown in FIG. 1. The oxygen mass transfer is expressed in moles/(l hr), and the distance of the tip of gas inlet tube 9 from the throat of the venturi is expressed in inches. Thus, the distance from the upstream beginning of throat 2 to the upstream end of converging section 3 was 1.81". The inside diameter of the flow conduit upstream of converging section 3 was 0.83". Thus, the positioning of tip 10 of gas inlet tube 9 can extend, in the practice of the invention, about 0.83" from the upstream end of converging section 3, i.e. about 2.6" upstream from the beginning of throat section 2. The water flow velocity in said 0.83" conduit was 0.73 meters per second. The operation was carried out at a pressure of 15 psig downstream of the venturi, with about 320 mg of oxygen being added per kilogram of water. It will be appreciated from the results illustrated in FIG. 2 that, from a mass transfer viewpoint, it is desirable to position the gas injection means as close to the throat of the venturi as practical. As the positioning of the gas injection means is moved further from the throat, but nevertheless within the converging section of the venturi, the mass transfer rate decreases but remains relatively high. Movement of the gas injection means outside the converging section of the venturi, but within the close proximity of a length not exceeding about one diameter of the liquid flow conduit, results in lower mass transfer rates. Movement of the gas injection means further upstream as in the prior art practice referred to above, however, results in even lower oxygen mass transfer rate characteristics.

It should be noted that the included angles of the converging and diverging sections of the venturi, sometimes referred to as cone angles, can vary widely in the practice of the invention. Those skilled in the art will appreciate that smaller, or shallower, included angles on the converging side of the venturi will result in lower amounts of pressure loss than if a larger or wider included angle is employed. Such smaller angled venturi sections are, however, correspondingly longer in overall length and thus require more complex and costly machining in the manufacture thereof. In addition, the positioning of the gas injection means cannot be as close to the throat section of the venturi as may be desired, from a mass transfer viewpoint, in smaller angled venturi sections because the positioning of the gas injection means close to the throat of the venturi would tend to cut off, or seriously reduce, the flow of fluid to the venturi throat. It will be appreciated that such an arrangement would also result in a significant pressure loss within the venturi and in the operating cost of the system. When a wider included angle is employed, on the other hand, the gas injection means can, if desired, be positioned closer to the venturi throat without cutting off, or seriously reducing, the fluid flow within the venturi. Such positioning of the gas injection means on a wider angled venturi will likewise result in a lesser pressure loss than that occurring if the same gas injection means were positioned close to the throat of a more shallow angled venturi.

While the mass transfer characteristics of a desired gas-liquid mixing operation are thus increasingly enhanced by the positioning of the gas injection means closer to the venturi throat, an overall consideration of the mass transfer and pressure loss effects frequently result in the positioning of the gas injection means within the venturi itself, or in close proximity thereto, but at a distance farther from the throat than would be suggested from a consideration of mass transfer effects alone. It will be appreciated that the optimum positioning of the gas injection means in accordance with the practice of the invention will depend upon a wide variety of pertinent operating factors, including the nature of the gases and liquids being mixed, the operating temperatures and pressures involved, the flow rates desired, the venturi or other flow constriction configuration desired, the nature of the gas dispersion operation, the overall economics pertaining to a given gas dispersion operation, and the like. In general, it has been found convenient to position the gas injection means at about 50% of the distance from the throat to the inlet to the converging section of the venturi. It will be appreciated from the above, however, that the position of the gas injection means can be adjusted widely within the venturi, or in close proximity thereto, within the scope of the invention.

While the gas injection means has been illustrated as being a gas inlet tube having a suitable gas injection tip, it is within the scope of the invention to employ a simple gas injection tube without incorporating a discharge tip or nozzle on the end portion thereof. In light of the disclosure above with respect to the flow encumbrance and pressure effects of the gas injection means, particularly as related to the movement of said gas injection means close to the venturi throat for enhanced mass transfer, it should be noted that it is desirable to make the gas injection tube as small and as streamlined as possible to reduce the pressure effects of its positioning at closer distances to the throat of the venturi. By incorporating an injection nozzle having a small tip portion, it is possible to position the nozzle at an optimal point farther in toward the venturi throat, with the increase in pressure drop resulting therefrom being adequately compensated for by the enhanced mass transfer characteristics obtained by such advantageous positioning of the injection nozzle near the venturi throat. To the extent permissible in light of the applicable flow requirements of a given gas-liquid dispersion operation, it would be desirable to employ a gas injection tube having an extended needle portion on the downstream end thereof, said needle portion being moveable to a position very close to the venturi throat without the significant increase in pressure loss resulting from the positioning of the gas injection tube itself in as close proximity to the venturi throat.

Figure 3:
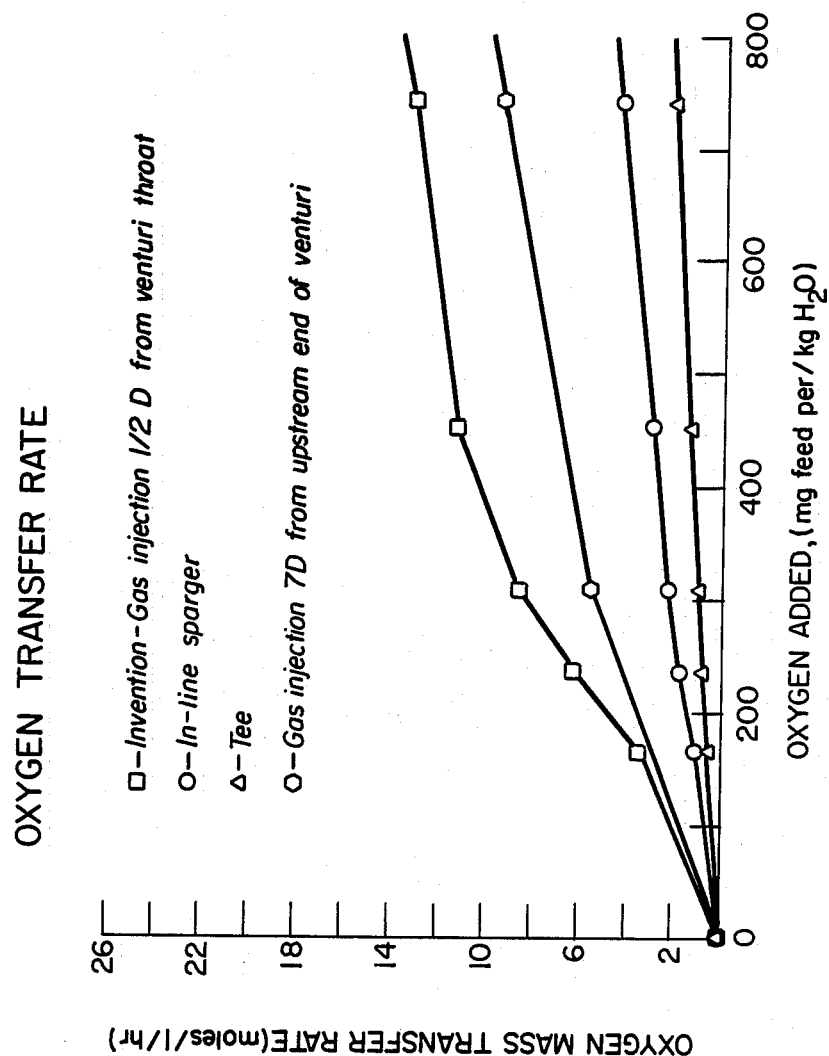
FIG. 3 is a chart illustrating the mass transfer rate of oxygen in water upon dispersion using a venturi in accordance with the practice of the invention, as compared with the prior art use of a venturi for gas liquid dispersion and with the use of an in line sparger or a conventional tee-inlet for injecting a gas into a stream of liquid.

The benefits of the invention as compared to conventional practices in the art have been further shown in a series of comparable oxygen-water mixing operations involving dispersion of the air in water by the use of the invention and three different prior art approaches. The practice of the invention is illustrated by the use of a venturi device in which the tip of the gas injection nozzle was positioned in the converging section of the venturi at a distance of $\frac{1}{2}$ the diameter of the liquid flow conduit from the throat of the venturi. In the use of the venturi approach carried out in accordance with conventional practice, the tip of the gas injection nozzle was positioned at an upstream distance from the inlet to the venturi of seven times the diameter of said liquid flow conduit. In another approach, i.e. one using a tee-shaped configuration, water was injected perpendicularly into the liquid flow conduit, and oxygen was injected into said liquid flow conduit in an axial manner in the vicinity of the water injection point. In still another approach using a so-called in-line sparger, water was injected into the liquid flow conduit, as in the tee approach, and oxygen was again injected axially into the conduit, but through a fritted tip intended to enhance the initial dispersion of gas into the liquid. It should be noted that the venturi device used in the practice of the invention and in the prior art practice was adapted to accelerate the velocity of the oxygen and water stream from less than the velocity of sound in said gas-liquid mixture to a supersonic velocity, with subsequent deacceleration to the sub-sonic range, while the tee-shaped configuration and in-line sparger were used in conjunction with a flow velocity at said sub-sonic range, without said acceleration to supersonic velocity accomplished by said venturi device. In each instance, the sub-sonic velocity was such as to provide an upstream flow velocity of about 0.73 meters per second of said gas liquid mixture, with the operating pressure being about 10 psig. The oxygen mass transfer rate, in moles/1/hr, was measured at various levels of oxygen addition, expressed in mg. of oxygen fed per kilogram of water, with the results being shown in FIG. 3 of the drawing.

It will be seen that the mass transfer rate for oxygen in the stream of water was relatively low using the conventional tee device for mixing oxygen and water. Somewhat improved mass transfer was found to be obtained using an in-line sparger, particularly at higher levels of oxygen addition. Considerably higher oxygen mass transfer rates were achieved using a venturi device to accelerate the flow velocity from less than that of sound to one where the velocity exceeds that of sound in the gas-liquid mixture, thereby enabling the oxygen bubbles to be very substantially broken up by the sonic shock wave affect accompanying the acceleration-deacceleration sequence to supersonic and back to sub-sonic velocity. In one venturi embodiment falling outside the scope of the invention, the oxygen was added to the liquid stream at a distance corresponding to seven times the upstream diameter of the flow conduit from the upstream end of the venturi. The water velocity was about 0.73 meters per second, which is considerably less than that required for turbulent flow conditions adequate to disperse the oxygen uniformly in the water. Such relatively low water velocity is, however, desirable from an overall processing viewpoint. In the other venturi embodiment falling within the scope of the invention, the water velocity was also maintained at about 0.73 meters per second upstream of the venturi. The oxygen was combined with the water, in accordance with the practice of the invention, at a point about equal to the diameter of the water flow conduit in distance from the 0.16" diameter throat of the venturi. As the converging section of the venturi used in such comparative runs was 1.81" long and the water flow conduit had an inside diameter of 0.83", the oxygen injection point was at about $\frac{1}{2}$ of the distance from the upstream beginning of the venturi throat to the upstream inlet to the converging section of the venturi. While the oxygen was thus combined with the water in the converging section of the venturi, a uniform dispersion of oxygen in water was not formed prior to the acceleration of the oxygen-water mixture to supersonic velocity as it passed to the throat section of the venturi. In the embodiment in which the oxygen was combined with the water at a distance of seven times the flow conduit diameter upstream of the venturi, it will be appreciated that the oxygen-water mixture entering the venturi at said flow velocity less than that required to disperse the oxygen uniformly in the water was likewise accelerated in velocity to the same extent as in the embodiment of the invention. As will be seen from FIG. 3, however, the oxygen mass transfer rate achieved in the practice of the invention was significantly increased over the results obtained at the same flow velocity conditions, but with oxygen injection being carried out in the water flow conduit at said point seven diameters upstream of the venturi.

The placing of the gas introduction means in close proximity to the flow constriction means used to create supersonic flow velocities will thus be seen to enable the gas mass transfer rate to be enhanced, and highly advantageous mass transfer/power requirement balances to be achieved in the practice of the invention. The improved results obtainable in the practice of the invention are deemed surprising, particularly since the prior art approach provides for a uniform dispersion of the gas in the liquid prior to acceleration of the gas-liquid mixture to supersonic velocity, whereas such uniform dispersion need not be achieved, and typically will not be achieved, in the practice of the invention. The advantageous results of the invention are, nevertheless, associated with the supersonic shock wave effect obtained as a result of the passage of the gas liquid mixture at a velocity deaccelerating from supersonic velocity to sub-sonic velocity in the downstream diverging portion of the venturi, and/or accelerating from a sub-sonic velocity to a supersonic velocity in the upstream converging portion of the venturi in which the gas and liquid are mixed. It should be understood that, depending upon the overall conditions pertaining to a given gas-liquid mixing operation, a dual sonic shock wave effect, i.e. upon deacceleration and upon initial acceleration of the gas liquid dispersion in the venturi device or other form of constriction means used to create supersonic flow velocities, may possibly be realized, and any such dual shock effect is within the scope of the invention.

Those skilled in the art will appreciate that various changes and modifications can be made in the details of the invention, without departing from the scope of the invention as recited in the claims. It will be understood, for example, that the speed of sound in a gas-liquid mixture will depend upon the components of said mixture and the operating conditions pertaining thereto. In general, however, the sonic velocity of a mixture will be very considerably lower than the speed of sound in either the liquid or the gas itself. It is this characteristic of sonic velocity that enables the invention and prior art operations based on acceleration to supersonic velocities and subsequent deacceleration to be carried out under practical, commercial operating conditions. Kieffer, "Sound Speed in Liquid-Gas Mixtures: Water Air and Water-Steam", Journal of Geophysical Research, Vol. 82, No. 20, July 10, 1977, pp. 2895–2903, confirm this effect which is used to advantage in practical commercial embodiments of the invention.

Depending on the particular gas/liquid ratio employed, the velocity of sound in an air/water mixture may be on the order of about 20 meters per second. The upstream velocity needed to achieve the results desired in the Garrett patent referred to above, i.e. less than that of the velocity of sound in the gas liquid dispersion, but sufficient to enable the gas bubbles to remain uniformly dispersed by turbulence to avoid slug flow or stratification, is generally at least on the order of about 2 meters per second. Those skilled in the art will appreciate that slug flow is disadvantageous and would result in undesired discontinuity of operation and results. In view of the surprising improvement of mass transfer and mass transfer/pressure results obtainable in the practice of the invention without the necessity of assuring that turbulent flow conditions adequate to disperse the gas uniformly in the liquid are created prior to acceleration to supersonic velocities, the water or other liquid flow velocity upstream of the venturi can be maintained at a considerably lower level than that pertaining in the prior art approach of Garrett. Thus, water flow velocities of from about 0.3 to 1 meter per second can conveniently be employed, although higher or lower velocities can also be employed. In any event, it is not necessary to create and maintain turbulent flow conditions upstream of the venturi sufficient to achieve uniform dispersion, either in applications in which the gas is injected into the venturi in the converging portion thereof or upstream but in close proximity to the venturi or other flow constriction means as indicated above. In the practice of the invention, the gas injected but not fully dispersed into the liquid stream do not have an opportunity to grow into large bubbles, which are more difficult to uniformly disperse. Such bubble growth would tend to occur in the prior art practice in which the gas is injected into the liquid at a greater distance upstream from the venturi, particularly if relatively low liquid flow velocities were employed. Those skilled in the art will appreciate gas will be injected into the liquid at a pressure greater than the pressure of the liquid in the flow conduit and such as to provide the desired ratio of gas to liquid.

Figure 4:
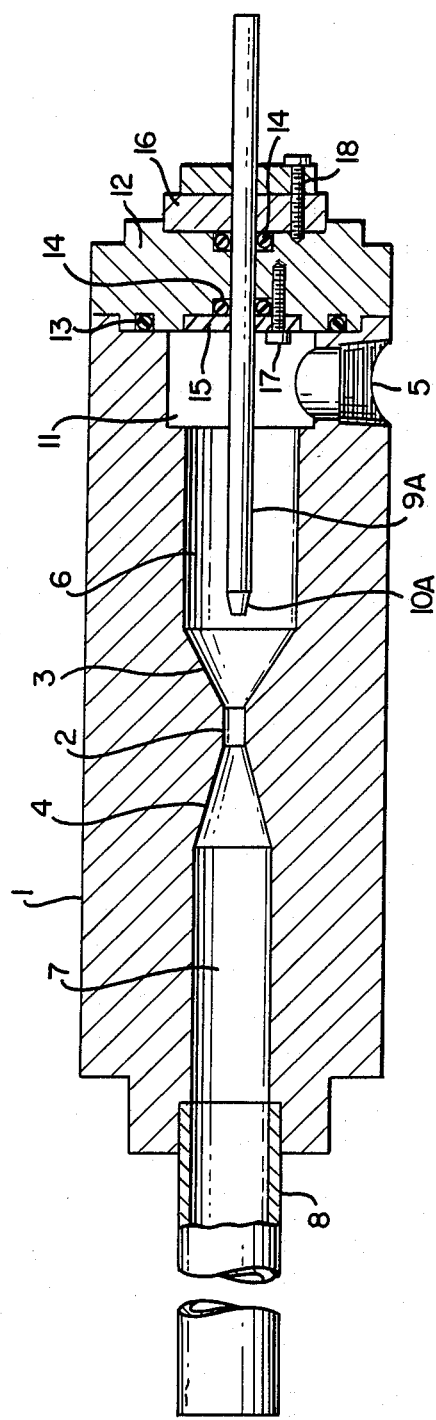
FIG. 4 represents a side-elevational view, partly in cross-section, of an embodiment of the gas-liquid dispersion system of the invention in which the gas injection point is positioned upsteam of a venturi rather than in the converging section thereof as in the FIG. 1 embodiment.

FIG. 4 is provided to illustrate an embodiment in which a gas inlet tube is positioned upstream of the venturi, at a distance from the upstream end thereof of less than the diameter of the upstream liquid flow conduit. The elements and numbering of the FIG. 4 embodiment will be seen as being identical with those of the FIG. 1 embodiment except that the gas inlet tube is numbered 9A and is shown with gas injection tip 10A positioned slightly upstream of the inlet to upstream converging section of the venturi.

Figure 5:
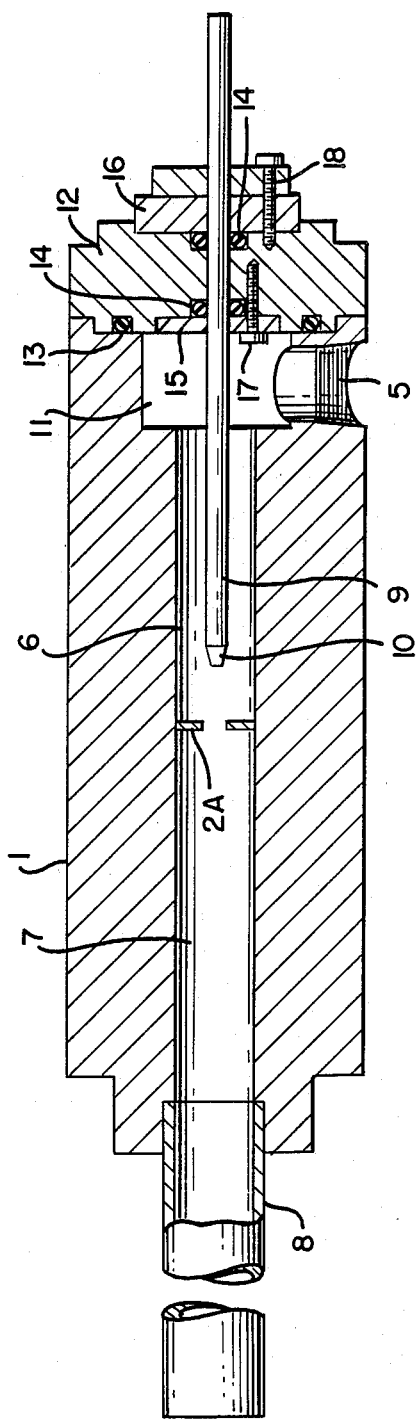
FIG. 5 represents a side-elevational view, partly in cross-section, of an embodiment of the invention in which an orifice is employed as a flow constriction means.

FIG. 5 illustrates another embodiment in which the venturi of FIG. 1 is replaced by an orifice plate as the flow constriction means. Thus, orifice plate 2A is positioned in the liquid flow conduit, thereby separating upstream flow line 6 from downstream flow line 7. Elements 2, 3, and 4 comprising the venturi in the FIG. 1 embodiment do not pertain with respect to the embodiment of FIG. 5. It will be seen that upstream gas inlet tube 9 and its gas injection tip 10 are positioned inn close proximity to said orifice plate 2A so as to preclude the uniform dispersion of gas and liquid prior to acceleration of the gas-liquid mixture to supersonic velocity and subsequent deacceleration as a result of said positioning of orifice plate 2A. It will be appreciated that the positioning of upstream gas inlet tube 9 can be varied with respect to orifice plate 2A, provided that it is not positioned upstream at a distance enabling a uniform dispersion gas and liquid to be formed prior to the acceleration resulting from the orifice plate. For this purpose, gas inlet tube 9 is preferably positioned at a distance upstream of orifice plate 2A not exceeding about one diameter of said upstream flow line 6.

The gas-liquid dispersion process and system of the invention can be applied to a wide variety of gas liquid mixing operations. Thus, the invention can be conveniently employed not only in the dissolution of oxygen in water application referred to above, but in a variety of operations in which it may be desirable to dissolve air or oxygen, nitrogen, chlorine or other industrial gas in a variety of inorganic or organic liquids. In addition, the invention can be applied to advantage for gas-liquid reaction operations, as for the oxidation of iron present in aqueous solution or for the oxidation of organic liquids. The invention can also be employed for desirable dissolved gas stripping operations, as for the stripping of dissolved oxygen or other volatiles from liquids by the injection of nitrogen therein in accordance with the practice of the invention.

The invention will thus be seen to provide a very desirable and beneficial advance in the art of dispersing gases in liquids. By enabling the mass transfer characteristics to the dispersion operation to be enhanced, the invention enables the benefits of employing venturi or other form of flow constriction means to be more fully realized than was heretofore obtainable in the art. By enabling the mass transfer to be significantly improved in advantageous balance with the power requirements of the gas-liquid dispersion operation, the invention further benefits the gas liquid dispersion art by providing a desirable processing flexibility enabling the overall benefits of the invention to be more fully related to the practical requirements of any particular commercial application. As the flow velocities employed in conjunction with the use of the constriction means can be maintained at a considerably lower level than in the prior art practice wherein turbulent flow conditions are required, the practical commercial feasibility of the invention is further enhanced, as is its benefit in a wide range of important commercial gas-liquid dispersion operations. The invention will thus be seen as serving to greatly increase the prospects for employing industrial gases in a wide variety of industrial activities in which the enhanced dispersion achieved in the practice of the invention provides a needed incentive for the desirably increased use of such gases in such industrial activities.

We claim:

1. An improved process for the dispersion of a gas in a liquid comprising:
   (a) combining said gas and liquid to form a gas bubble-liquid mixture under non-turbulent flow conditions such that a uniform dispersion of gas bubbles and liquid is not formed, said mixture having a flow velocity of less than the velocity of sound in said gas bubble-liquid mixture;
   (b) passing said nonuniformly dispersed gas bubble-liquid mixture under non-turbulent flow conditions into contact with flow constriction means positioned downstream of, but in close proximity to, the point at which said gas and liquid are mixed;
   (c) accelerating the flow velocity of said gas bubble-liquid mixture to a supersonic velocity, by passage through said flow constriction means;
   (d) subsequently deaccelerating said flow velocity from supersonic velocity to sub-sonic range, the acceleration-deacceleration of the pre-formed gas bubble-liquid mixture upon passage through said flow constriction means serving to create a sonic shock wave resulting in an extremely fine dispersion of gas bubbles in the liquid, the close proximity of the flow constriction means to the point of initial formation of the gas bubble-liquid mixture under non-turbulent conditions precluding the uniform dispersion of gas and liquid prior to the acceleration of the gas bubble-liquid mixture to a supersonic velocity and subsequent deacceleration thereof, whereby the mass transfer characteristics of the gas bubble-liquid dispersion, and the mass transfer-power consumption balance, are enhanced by this subjecting of the gas-liquid mixture, initially in nonuniformly dispersed form, to the sonic shock wave effect of said flow constriction means.

2. The process of claim 1 in which said flow constriction means comprises an orifice plate.

3. The process of claim 1 in which said flow constriction means comprises a reduced diameter section of a flow conduit through which said gas and liquid are being passed.

4. The process of claim 1 in which said flow constriction means comprises a venturi.

5. The process of claim 1 in which said gas is oxygen, and said liquid is water.

6. The process of claim 1 in which said gas-liquid dispersion comprises a process for the reaction of the gas and liquid.

7. The process of claim 1 in which said gas-liquid dispersion comprises a process in which the gas is used to strip dissolved gas from the liquid.

8. The process of claim 1 in which said flow constriction means is positioned in the flow conduit through which one of the fluids to be mixed is passed, the other fluid being added thereto upstream of said flow constriction means at a distance therefrom not exceeding about one diameter in length, based on the diameter of said flow conduit through which said fluid is passed upstream of said flow constriction means.

9. The process of claim 5 in which said liquid is passed through the flow conduit and said gas is injected therein to form a gas bubble-liquid mixture.

10. The process of claim 9 in which said gas is injected into a stream of liquid at an injection point positioned within the converging section of the venturi.

11. The process of claim 10 in which said gas injection point is positioned at about one half of the distance from the throat of the venturi to the upstream end of the converging section thereof.

12. The process of claim 10 in which said gas injection point is close to the throat of the venturi.

13. The process of claim 10 in which said gas injection point is positioned in the flow conduit upstream of the converging section of the venturi.

14. An improved system for the dispersion of a gas in a liquid comprising:
   (a) a flow conduit in which said gas and liquid are to be combined;
   (b) flow means for passing one of the fluids to be combined through said flow conduit under non-turbulent conditions;
   (c) injection means for injecting the other fluid for the desired combination of gas and liquid into said flow conduit to form a gas bubble-liquid mixture under said non-turbulent conditions such that a uniform dispersion of gas bubbles and liquid is not formed; and
   (d) flow constriction means positioned in said flow conduit downstream of said injection means but in close proximity thereto, said flow constriction means being adapted to accelerate the flow velocity of said nonuniformly dispersed gas bubble-liquid mixture from said non-turbulent flow conditions to a supersonic velocity, with subsequent deacceleration of the flow velocity to sub-sonic range, such acceleration-deacceleration action of the flow constriction means serving to create a sonic shock wave effect resulting in an extremely fine dispersion of the gas bubbles in the liquid, the close proximity of the flow constriction means in the flow conduit to the position of said injection means precluding the uniform dispersion of gas bubbles and liquid prior to the acceleration of the gas bubble-liquid mixture to a supersonic velocity, and subsequent deacceleration to sub-sonic velocity, whereby the mass-transfer characteristics of the gas bubble-liquid dispersion, and the mass transfer-power consumption balance, can be enhanced by thus subjecting the gas bubble-liquid mixture, initially in nonuniformly dispersed form, to the sonic shock wave effect of said flow constriction means.

15. The system of claim 14 in which said flow constriction means comprises an orifice plate.

16. The system of claim 14 in which said flow constriction means comprises a reduced diameter section of said flow conduit.

17. The system of claim 14 in which said flow constriction means comprises a venturi.

18. The system of claim 14 in which said injection means is positioned upstream of said flow constriction means at a distance therefrom not exceeding about one diameter in length, based on the diameter of said flow conduit through which said fluid is passed upstream of said flow constriction means.

19. The system of claim 18 in which said flow means comprises means for passing liquid through said flow conduit, and said injection means comprises means for injecting gas into the liquid passing through said flow conduit.

20. The system of claim 19 in which said gas injection means is positioned within the converging section of the venturi.

* * * * *